United States Patent
Park

(10) Patent No.: US 6,753,981 B1
(45) Date of Patent: Jun. 22, 2004

(54) METHOD FOR SCANNING A SPECIFIC PORTION OF DOCUMENT IN FLAT-BED TYPE MULTI-FUNCTION PRODUCT

(75) Inventor: Jae-Hong Park, Yongin (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 09/567,329

(22) Filed: May 9, 2000

(30) Foreign Application Priority Data

May 12, 1999   (KR) .................................. 10-1999-16906

(51) Int. Cl.$^7$ ................................................ H04N 1/04
(52) U.S. Cl. ........................ 358/474; 358/1.2; 358/501
(58) Field of Search ................................ 358/474, 505, 358/501, 1.2, 513, 401, 538

(56) References Cited

U.S. PATENT DOCUMENTS

| | | | |
|---|---|---|---|
| 4,866,474 A | * | 9/1989 | Kinoshita .................... 355/218 |
| 5,424,853 A | * | 6/1995 | Miyaza ........................ 358/451 |
| 5,517,326 A | * | 5/1996 | Miyaza et al. ............... 358/450 |
| 5,663,809 A | * | 9/1997 | Miyaza et al. ............... 358/450 |
| 5,719,404 A | * | 2/1998 | Tsai ........................... 358/476 |

FOREIGN PATENT DOCUMENTS

| | | | | |
|---|---|---|---|---|
| JP | 02155366 | * | 6/1990 | ............ H04N/1/17 |
| JP | 402155366 A | * | 6/1990 | |

* cited by examiner

*Primary Examiner*—Kimberly Williams
*Assistant Examiner*—Negussie Worku
(74) *Attorney, Agent, or Firm*—Robert E. Bushnell, Esq.

(57) ABSTRACT

A selected section reading method of a flat-bed type multi-function product enables scanning of a desired selected section in the desired resolution by limiting the necessary selected section by inputting the horizontal and vertical direction coordinates through the operation panel after determining the horizontal and vertical coordinates for the scanning section from a ruler of the loading surface. Accordingly, there are the advantages in which a desired selected scanning section included in the total readable domain is able to be scanned in the actual resolution without moving the document or having to pre-scan the document, and the portion scanned in this manner may be magnified, reduced, processed for improved quality and photocopied and transmitted through a facsimile. In addition, the time wasted on reading portions that are needless to the user is saved, and the satisfaction level of user can be increased through the omission of inconvenient operations such as pre-scanning, re-scanning, editing/deleting and the like.

19 Claims, 3 Drawing Sheets

METHOD FOR SCANNING A SPECIFIC PORTION OF DOCUMENT IN FLAT-BED TYPE MULTI-FUNCTION PRODUCT

BACKGROUND OF THE INVENTION

1. Field of Invention

This invention relates to a method for reading a specific portion of document in a flat-bed type multi-function product, and more particularly, in a flat-bed type multifunction product, a method of determining scanning section coordinates, which are the vertical and horizontal coordinates for a scanning section, from a ruler of the document loading surface and then reading the scanning section in the desired resolution by inputting the scanning section coordinates through an operation panel.

2. Related Art

Recently, through the lift of the rapid development of office appliances, as the demand for office appliances such as printers, scanners, digital photocopiers and facsimiles is on a sudden up-rise, the respective office appliances are being developed for higher performance to expand their characteristic features. In addition, respective office appliances, which were used independently, are now being developed into a single integrated unit, and products, which reduce expenses on the part of the consumers, save installation space and at the same time perform multi-document output functions, are being produced and supplied. Generally, these products are referred to as 'all-in-one' multifunction products (MFP).

In other words, the multifunction product is a machine with multi-document output functions that performs not only functions as a printer which prints data inputted into the host computer, but also has functions of a scanner which reads images, a digital photocopier which copies scanned and printed images, and a facsimile which transmits images through communication lines. Namely, as a multifunction product which is the combination of the existing sole unit such as the facsimile, scanner, printer, and digital photocopier, it is typical that the multifunction product is provided with a host computer interface function of interoperation with the host computer.

Mainly there are two types of scanners available, i.e. the flat-bed type and the sheet-feed type, and this invention relates to the flat-bed type.

FIG. 1 is a block diagram which depicts the hardware composition of a standard flat-bed type multifunction product.

In a conventional flat-bed type multifunction product, the CPU (central processing unit; 100) performs the function of controlling the overall copying, transmitting and receiving of documents according to a predetermined program. The memory 107 has the program data and the protocol data stored therein and accesses or stores the document image data and the reception data through the control of the CPU 100.

The operation panel 105 is provided with numerous keys that generate key data which set the system actuation modes, and when the key data is generated, it is inputted into the CPU 100, and a display (that is, an indication device) shows the indication data of the CPU 100.

The flat-bed type scanner module 104 reads image data. The scanner module moves beneath a glass surface upon which documents are arranged and reads the document placed on the loading surface. The main function of the scanner module is reading the document image and providing digital data to the CPU 100.

By the control commands received from the CPU 100, the modem 102 modulates the output data of the CPU 100 to an analog format and then demodulates analog reception input and outputs the output data. The communication control unit 101 is actuated according to the controls of the CPU 100, and forms a phone line (tip, ring) communication loop, and performs interfacing functions between the (de)modulated signals of the modem 102 and the phone line signals.

The printer 103 prints the document image data read from the flat-bed scanner module 104 and the reception data from the modem 102 according to control signals of the CPU 100. The sensor 106 monitors the remaining amount of paper and provides this information to the CPU 100, and the speaker 108 performs the function of generating warning sounds according to the controls of the CPU 100.

The present invention directly relates to the scanning section setting method of a flat-bed type multifunction product configured as the above, and therefore the scanning section setting method according to prior art will be discussed.

In the case of the flat-bed type scanner according to prior art, most typically the function of pre-scanning is chosen and used for the method of reading a desired portion of a document. For example, to obtain the overall shape of information of a document with a low resolution of approximately 75 dpi (dots per inch), the pre-scan data is read at a high speed and then the pre-scanned data is displayed on a monitor of a connected computer, and when the user selects the desired section, data scanning for the final desired section is performed by reading the selected section once more at a resolution selected by the user.

As another method, the editing method is used, wherein the maximum readable domain is scanned at a resolution selected by the user, and then when the scanned data is displayed on a monitor of a connected computer, all other sections excluding the desired section are deleted.

However, in the prior art scanning section selection method, although the former supplements the drawbacks in reading speed by choosing the pre-scan concept, there is the inconvenience of having to perform re-scanning in the resolution selected by the user after low resolution pre-scanning has been performed, and there is also the disadvantage of having to waste several minutes of time for preparation to read the desired sections of a document depending on the interface modes of the computer in use.

On the other hand, since the latter is a method in which the document is scanned at actual resolution and then edited, it may be considered as a very inefficient method for reading selected sections of a document because the time wasted for scanning the whole document must be compromised.

Furthermore, in reading documents with the scanning section selecting methods of the above prior art, not only do the methods read sections that are not wanted by the user, but when the size of the actual document is smaller than the total reading domain, there is a problem of needlessly scanning sections which do not even exist.

In addition, to support the flat-bed type digital photocopying function which is included in standard flat-bed type multifunction products, there is always a defined reference point, and therefore to reduce or magnify desired portions, there is a disadvantage of having to perform photocopying by rearranging the needed portion of the document on to the reference point.

SUMMARY OF THE INVENTION

Therefore the intention of this invention to resolve the problems set forth in a flat-bed type multifunction product, where the object thereof is to provide a selected section reading method of a flat-bed type multifunction product which enables fast and accurate scanning of only the desired selected section by inputting the scanning section coordinates through the user after determining the coordinates of the desired scanning section by using a ruler on the loading surface.

To achieve the above object, in setting the scanning section of the flat-bed type multifunction product, the selected section reading method according to the present invention is characterized in that, it allows scanning of the desired selected scanning section included in the total readable domain, in the actual resolution that the user desires without performing pre-scanning and moving the document, by limiting the necessary selected section by inputting the horizontal and vertical direction coordinates through the operation panel after determining the horizontal and vertical coordinates for the scanning section from the ruler of the loading surface, and it allows reducing, magnifying, and quality improvement processing of the scanned portion and one-to-one scale photocopying, storing, and facsimile transmissions.

DETAILED DESCRIPTION OF THE PREFERRED EMBODIMENT

The selected section reading method of a flat-bed type multifunction product according to this invention will be described hereinafter with reference to FIG. 2.

Figure 1:
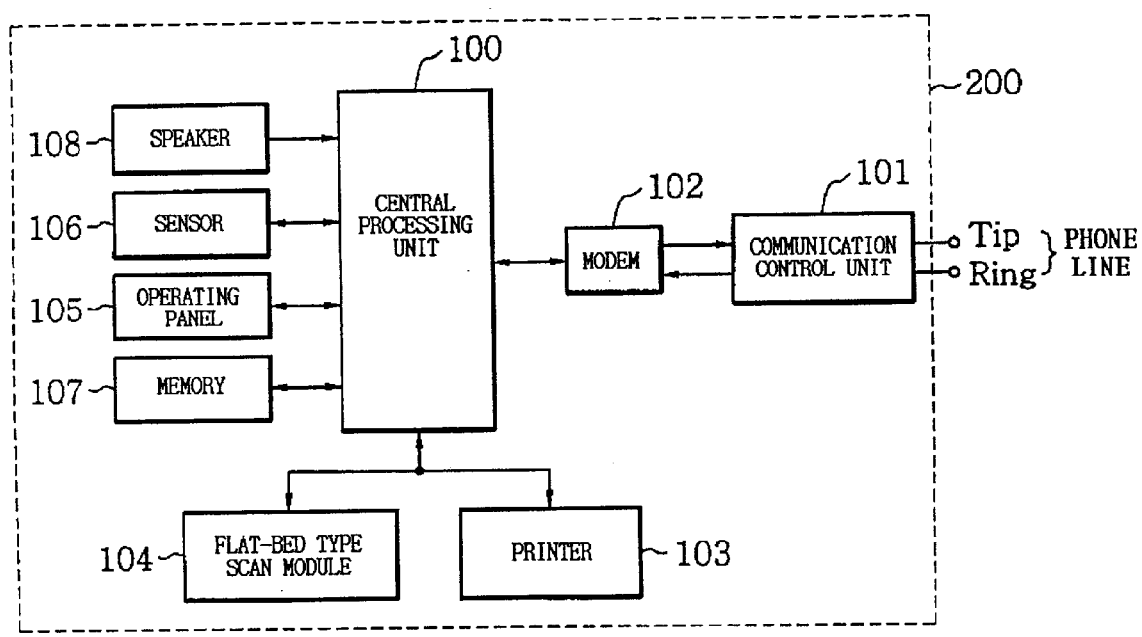
FIG. 1 is a block diagram showing the hardware composition of a standard flat-bed type multifunction product.
Figure 2:
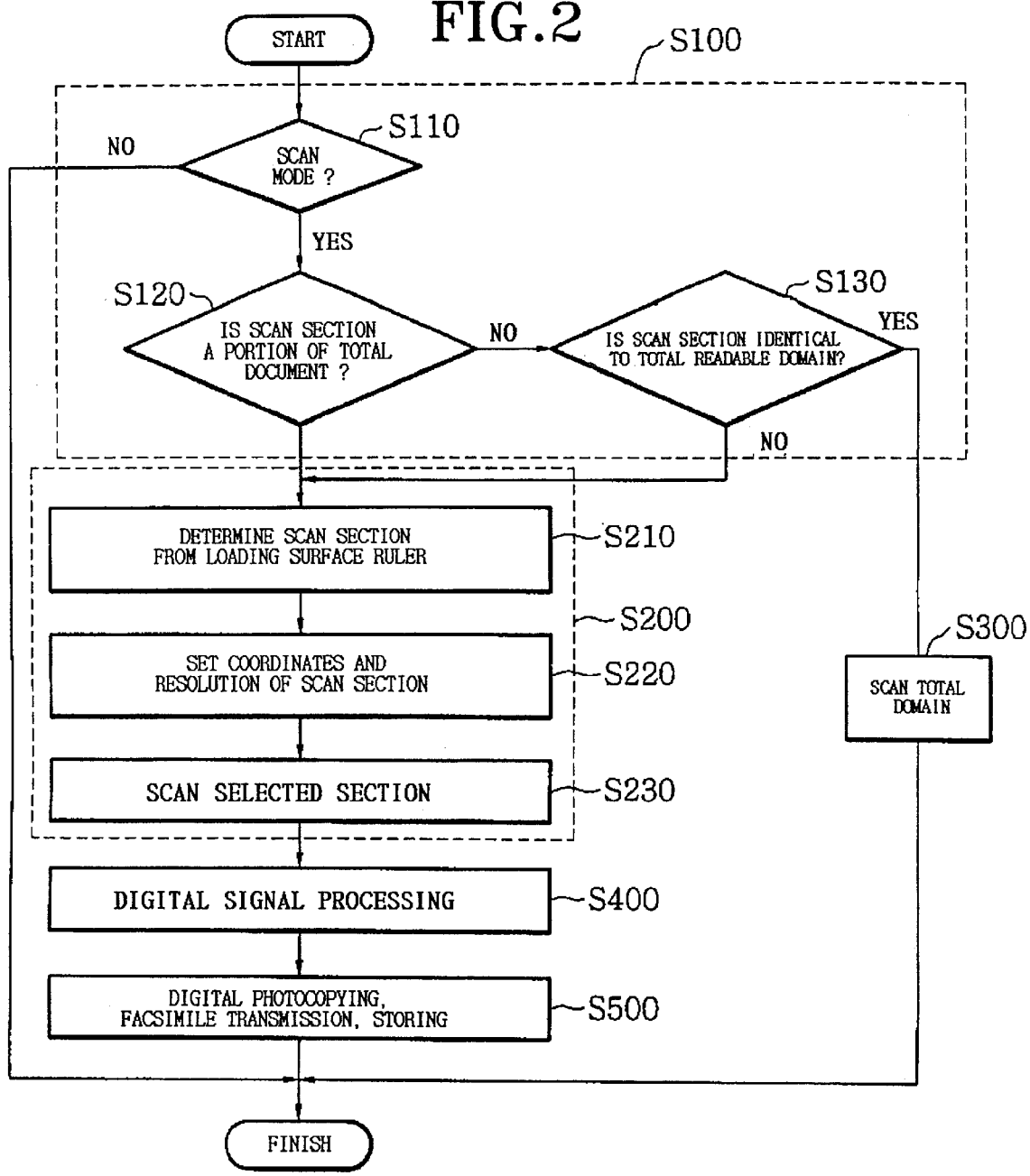
FIG. 2 is a flow chart showing the selected section reading method of a flat-bed type multifunction product according to the present invention.

FIG. 2 is a flow chart showing the selected section reading method of a flat-bed type multifunction product according to this invention.

As shown in FIG. 2, in a selected section reading method of a flat-bed type multifunction product provided with an operation panel that allows user input and a ruler on the document loading surface, the selected section reading method of a flat-bed type multifunction product according to this invention includes the steps of: determining the scanning section, which determines whether the scanning section is a portion of the total document or it is identical to the total document, when the operation mode of the multifunction product is confirmed to be in scan mode (S100); selected scanning, which obtains scan data by reading the scanning section in the desired resolution by inputting scanning section coordinates through the operation panel after determining the scanning section coordinates which are the horizontal and vertical coordinates for the scanning section from a ruler of the document loading surface, if the scanning section is a portion of the total document or it is not identical to the total readable domain as a result of the scanning section determining step S100 (S200); total scanning, which obtains scan data by reading the total readable domain, if the scanning section is identical to the total readable domain as a result of the scanning section determining step S100 (S300); signal processing, which performs digital signal processing on the scan data according to user commands (S400); and performing at least one of the functions among digital photocopying, storing, or facsimile transmission for the digital signal processed data (S500).

Furthermore, the scanning section determining step (S100) includes the steps of: determining the operation mode, which determine whether the operation mode is in scan mode (S110), first scanning section determining, which determines whether the scanning section is a portion of the total document when the operation mode is determined to be in scan mode as a result of the operation mode determining step S110 (S120), second scanning section determining, which determines whether the scanning section is identical to the total readable domain if the scanning section is the total document as a result of the first scanning section determining step S120 (S130).

In addition, the selected scanning step (S200) includes the steps of: determining the scanning section coordinates, which determines the scanning section coordinates from a ruler of the document loading surface, if the scanning section is a portion of the total document or it is not identical to the total readable domain as a result of the scanning section determining step S100 (S210); selecting the scan environment, which inputs the scanning section coordinates and scan resolution through the operation panel (S220); scanning the selected section, which scans the scanning section in the desired resolution at different speeds of the flat-bed scanner module between the scanning section and the actual sections that do not need to be scanned, to reduce scanning time according to the scan initiation command (S230).

The procedure of the selected section reading method of the flat-bed type multifunction product according to this invention will be described in detail with reference to FIG. 2.

Firstly, the scanning section determining step (S100) determines whether the operation mode is in scan mode at the operation mode determining step (S100), and if the operation mode is determined to be in scan mode as a result of the operation mode determining step (S100), it determines whether the scanning section is a portion of the total document at the first scanning section determining step (S120), and if the scanning section is the total document as a result of the first scanning section determining step (S120), it determines whether the scanning section is identical to the total readable domain at the second scanning section determining step (S130).

Figure 3:
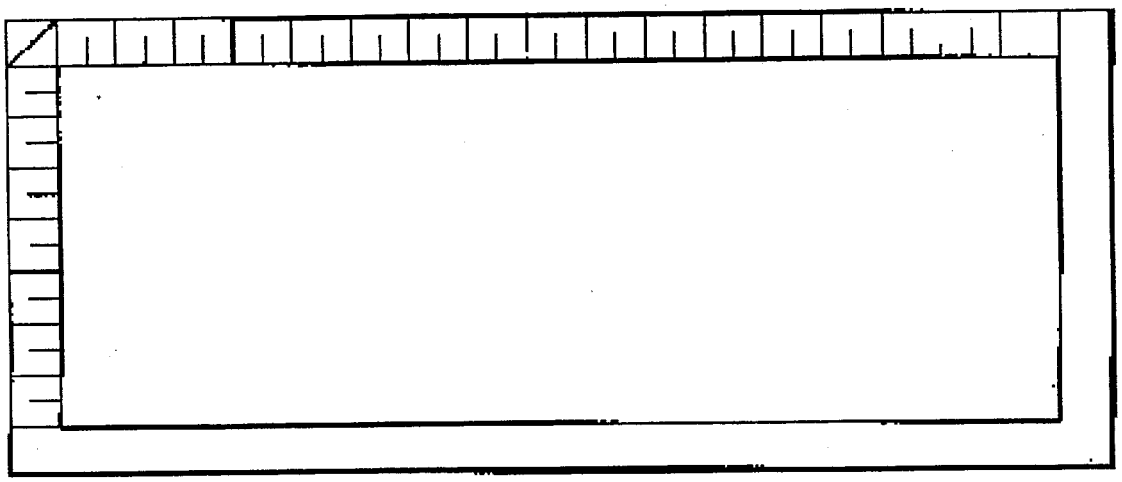
FIG. 3 is an illustrative diagram showing an exemplary document loading surface of the present invention.

If the scanning section is a portion of the total document or is not identical to the total readable domain as a result of the scanning section determining step (S100), the selected scan step (S200) determines the scanning section coordinates, which are the horizontal and vertical coordinates for the scanning section, from the ruler of the document loading surface, as shown in FIG. 3, and then through user key input it sets the horizontal and vertical coordinates for the scanning section (that is, scanning section coordinates) and obtains scan data by reading the scanning section in the desired resolution. If the scanning section is identical to the total readable domain (S130) as a result of the scanning section determining step (S100), the total scan step (S300) obtains scan data for the whole document by reading the total readable domain.

Further discussing the selected scan step (S200), if the scanning section is a portion of the total document or is not identical to the total readable domain as a result of the scanning section determining step (S100), the scanning section coordinate setting step (S200) determines the scanning section coordinates, which are the horizontal and vertical coordinates for the scanning section, from the ruler of the document loading surface, and then through user key input, the scan environment setting step (S220) sets the scanning section coordinates and the desired scanning resolution, and the selected section scan performing step (S230) obtains scan data, by scanning the scanning section in the scanning resolution at different speeds of the flat-bed scanner module between the actual scanning section and the actual sections that do not need to be scanned to reduce scanning time according to the scan initiation command.

Thereafter, the signal processing step (S400) performs digital signal processing on the scan data according to user commands. Typical digital signal processing which may be used at this step are magnifying and reducing the scan data, various picture quality improvements and in particular, processing for the auto-fit function which magnifies small images to the size of a full page when supporting digital photocopying functions, processing for the cloning function which copies and prints several reduced images on one page, and processing for the poster function which prints one images on several pages.

Finally, step S500 performs at least one function among digital photocopying, storing, and facsimile transmission for the digitally processed data, which may be basically supported by a standard multifunction product.

In the present invention, to determine the scanning section coordinates, other methods such as grid sheets and other means to recognize coordinates may be used instead of the ruler on the document loading surface, and it is a well known fact that other rulers and lattices which provide vertical and horizontal measurements may be used.

The terminology used in this specification are defined terms accounting for the functions of this invention and may vary according to the intentions and conventions of those skilled in the art, and therefore the definitions thereof should be given on the basis of the overall contents of this specification.

In addition, the present invention has been described in detail in connection to the preferred embodiment, and considering the degree of difficulty involved in this invention, it is apparent that many alternatives are possible within the scope of the invention. Therefore, the scope of this invention obviously should not be limited to the described embodiment but the claims set forth hereinafter and also to the equivalents thereof.

As discussed in detail, in a flat-bed type multifunction product, according to the present invention, which limits the scanning section to a necessary selected section by inputting horizontal and vertical coordinates through an operation panel after determining the horizontal and vertical coordinates for the scanning section from the ruler of the document loading surface, there are the advantages in which a desired selected scanning section included in the total readable domain is able to be scanned in the actual resolution without moving the document or having to pre-scan the document, and the portion scanned in this manner may be magnified, reduced, processed for improved quality and photocopied and transmitted through a facsimile.

In addition, the time wasted on reading portions that are needless to the user is saved, and the satisfaction level of user can be increased through the omission of inconvenient operations such as pre-scanning, re-scanning, editing/deleting and the like.

It is to be understood, however, that even though the present invention has been described with reference to the annexed drawings which depict the preferred embodiment thereof, the present invention is not limited to said embodiment, and may apparently be modified in many ways by those ordinarily skilled in the art without departing from the general principle and scope of the invention expressed in the appended claims.

What is claimed is:

1. A selected section reading method which improves scanning speed by limiting a scanning section of a flat-bed type multifunction product provided with an operation panel which receives user's input and a ruler on a loading surface, to a necessary section, comprising the steps of:

selected scanning obtaining scan data by reading said scanning section in the desired resolution by inputting scanning section coordinates through said operation panel after determining the scanning section coordinates which are the horizontal and vertical coordinates for said scanning section from a ruler of said document loading surface, when said scanning section is not identical to the total readable domain; and total scanning obtaining scan data by reading the total readable domain, when said scanning section is identical to the total readable domain, with the total readable domain being all the area that can be scanned.

2. The selected section reading method of a flat-bed type multifunction product of claim 1, further comprising the step of determining the scanning section determining whether said scanning section is a portion of the total document or said scanning section is identical to the total readable domain, said step of total scanning obtaining scan data by reading said total readable domain, when said scanning section is identical to the total readable domain being as a result of said step of determining the scanning section.

3. The selected section reading method of a flat-bed type multifunction product of claim 2, wherein said scanning section determining step comprises the steps of:

determining the operation mode, which determine whether the operation mode is in scan mode;

first scanning section determining whether said scanning section is a portion of the total document when said operation mode is determined to be in scan mode as a result of said operation mode determining step; and second scanning section determining whether said scanning section is identical to the total readable domain when said scanning section is the total document as a result of said first scanning section determining step.

4. The selected section reading method of a flat-bed type multifunction product of claim 2, wherein said selected scanning step comprises the steps of:

determining the scanning section coordinates, which determines said scanning section coordinates from a ruler of said document loading surface, when said scanning section is a portion of the total document or it is not identical to the total readable domain as a result of said scanning section determining step;

selecting the scan environment, which inputs said scanning section coordinates and scan resolution through said operation panel; and scanning the selected section, which scans said scanning section in the desired resolution at different speeds of the flat-bed scanner module between said scanning section and the actual sections that are not scanned, to reduce scanning time according to the scan initiation command.

5. The selected section reading method of a flat-bed type multifunction product of claim 1, further comprising the steps of:
  signal processing, which performs digital signal processing with respect to said scan data according to user's commands; and
  performing at least one function among digital photocopying, storing, and facsimile transmission with respect to the digital signal processed data.

6. The method of claim 1, further comprised of a user inputting scanning section coordinates through said operation panel after determining, by the user, the scanning section coordinates which are the horizontal and vertical coordinates for said scanning section from a ruler of said document loading surface.

7. A method, comprising:
  determining whether a scanning section is one of a portion of the total readable medium or identical to a total readable medium when the operation mode of a multifunction product is confirmed to be in a scan mode, the total readable medium being the total readable domain of the readable medium; and
  selected scanning obtaining data by reading the scanning section in a desired resolution by inputting scanning section coordinates through an operational panel after determining the scanning section coordinates from a ruler of a readable medium loading surface of the multifunction product, when the scanning section is a portion of the total readable medium or is not identical to a total readable domain of the readable medium as a result of said act of determining whether a scanning section is one of a portion of the total readable medium or identical to a total readable medium.

8. The method of claim 7, further comprising of total scanning by obtaining scan data by reading the total readable domain when the scanning section is identical to the total readable domain as a result of the act of determining whether a scanning section is one of a portion of the total readable medium or identical to a total readable medium.

9. The method of claim 8, further comprising of digital signal processing of a scan data according to user commands, the scan data being obtained from the act of selected scanning.

10. The method of claim 9, further comprising of performing at least one of the functions among digital photocopying, storing, and facsimile transmission of the digital signal processed data.

11. The method of claim 9, further comprising of the multifunction product being a flat-bed type multifunction product.

12. The method of claim 8, with said determining whether a scanning section is one of a portion of the total readable medium or identical to a total readable medium comprising:
  determining whether the operation mode is in scan mode;
  first scanning section determining whether said scanning section is a portion of the total readable medium when said operation mode is determined to be in scan mode as a result of said operation mode determining step; and
  second scanning section determining whether said scanning section is identical to the total readable domain when said scanning section is the total readable medium as a result of said first scanning section determining step.

13. The method of claim 8, with said selected scanning comprising of:
  determining the scanning section coordinates, which determines said scanning section coordinates from a ruler of said readable medium loading surface, when said scanning section is a portion of the total readable medium or it is not identical to the total readable domain as a result of said scanning section determining step;
  selecting the scan environment, which inputs said scanning section coordinates and scan resolution through said operation panel; and
  scanning the selected section, which scans said scanning section in the desired resolution at different speeds of the flat-bed scanner module between said scanning section and the actual sections that are not scanned, to reduce scanning time according to the scan initiation command.

14. The method of claim 7, with said determining whether a scanning section is one of a portion of the total readable medium or identical to a total readable medium comprising:
  determining whether the operation mode is in scan mode;
  first scanning section determining whether said scanning section is a portion of the total readable medium when said operation mode is determined to be in scan mode as a result of said operation mode determining step; and
  second scanning section determining whether said scanning section is identical to the total readable domain when said scanning section is the total readable medium as a result of said first scanning section determining step.

15. The method of claim 7, with said selected scanning comprising of:
  determining the scanning section coordinates, which determines said scanning section coordinates from a ruler of said readable medium loading surface, when said scanning section is a portion of the total readable medium or it is not identical to the total readable domain as a result of said scanning section determining step;
  selecting the scan environment, which inputs said scanning section coordinates and scan resolution through said operation panel; and
  scanning the selected section, which scans said scanning section in the desired resolution at different speeds of the flat-bed scanner module between said scanning section and the actual sections that are not scanned, to reduce scanning time according to the scan initiation command.

16. The method of claim 7, with the readable medium being a document.

17. The method of claim 16, with said determining whether a scanning section is one of a portion of the total readable medium or identical to a total readable medium comprising:
  determining whether the operation mode is in scan mode;
  first scanning section determining whether said scanning section is a portion of the total readable medium when said operation mode is determined to be in scan mode as a result of said operation mode determining step; and
  second scanning section determining whether said scanning section is identical to the total readable domain when said scanning section is the total readable medium as a result of said first scanning section determining step.

18. The method of claim 17, with said selected scanning comprising of:

determining the scanning section coordinates, which determines said scanning section coordinates from a ruler of said readable medium loading surface, when said scanning section is a portion of the total readable medium or it is not identical to the total readable domain as a result of said scanning section determining step, the coordinates being horizontal and vertical coordinates for said scanning section from the ruler of said readable medium loading surface;

selecting the scan environment, which inputs said scanning section coordinates and scan resolution through said operation panel; and scanning the selected section, which scans said scanning section in the desired resolution at different speeds of the flat-bed scanner module between said scanning section and the actual sections that are not scanned, to reduce scanning time according to the scan initiation command.

19. The method of claim 18, further comprised of a user inputting scanning section coordinates through said operational panel after determining, by the user, the scanning section coordinates from a ruler of a readable medium loading surface of the multifunction product.

* * * * *